Jan. 1, 1946.　　A. J. CACARILLO　　2,392,118
CROSSED LEVER TOOL
Filed Dec. 28, 1944
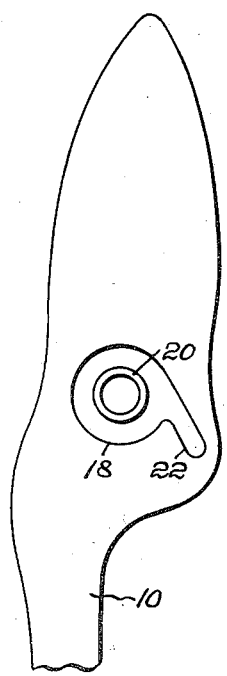
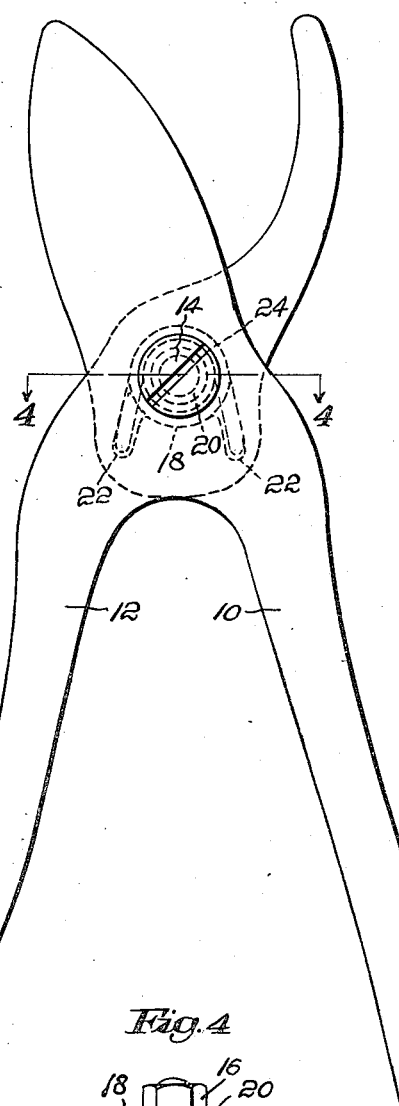
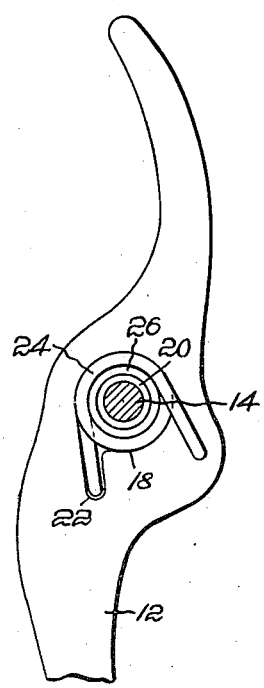
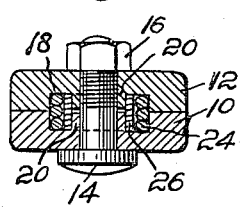
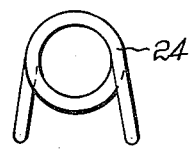
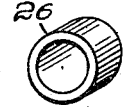
Inventor.
Anthony J. Cacarillo,
by Emery, Booth, Townsend, Miller & Weidner
Attys Patented Jan. 1, 1946

2,392,118

UNITED STATES PATENT OFFICE 2,392,118

CROSSED-LEVER TOOL

Anthony J. Cacarillo, Worcester, Mass., assignor to Parker Manufacturing Company, Worcester, Mass., a corporation of Massachusetts Application December 28, 1944, Serial No. 570,115

4 Claims. (Cl. 30—261)

This invention relates to hand tools of the crossed-lever type and in particular to those which are spring-operated in one direction. The object is to provide an improved construction whereby a small spring may be used (conveniently entirely housed in the joint of the tool) but wherein the spring will be practically proof against fatigue and breakage.

My invention will be well understood by reference to the following description taken in connection with the accompanying drawing wherein I have shown by way of example a pruning shear although it will be understood that the invention may be applied to crossed-lever tools with any form of jaw. In the drawing—

Fig. 1 is an elevation of the pruning shear in open position;

Fig. 2 shows the upper portion of the uppermost blade of Fig. 1 as if raised and turned over to the left showing the interior surface thereof;

Fig. 3 is an interior view of the lower blade, viewing Fig. 1;

Fig. 4 is a section on the line 4—4 of Fig. 1;

Fig. 5 is an elevation of the spring; and

Fig. 6 is a perspective of a sleeve which is used in the construction.

The tool shown in the drawing embodies a pair of crossed levers 10 and 12, the lever 10 in the example shown being an edged blade and the lever 12 a cooperating relatively blunt hook blade, although the nature of the jaws is not material. These are secured together by a pivot pin 14 which may be secured in the jaw 12 by a thread and a lock nut 16 and on which the lever 10 may freely turn.

The opposed inner faces of the levers at the joint are provided with opposed complementary annular recesses 18 which define bosses 20 through which the pivot pin passes, each of the recesses having an extension 22 which preferably does not extend to the margins of the respective levers. As best seen in Fig. 4, the recesses 18 house a coiled torsion spring 24 (Fig. 5), the ends of which are received in the extensions 22 and are thereby anchored to the respective levers 10 and 12 so that the spring is stressed when the tool is closed and the spring normally tends to return the levers to the open position of Fig. 1.

I have referred to the spring 24 as a coiled torsion spring, its resiliency arising from the coiled portion and but little from the extending portions shown in Fig. 5 which are received in the extensions 22 of the recesses. It is thus contrasted with a spring having long resilient legs which might be joined by a loop. Therefore, it may be organized within a small space at the joint of the tool and conveniently may be entirely housed within the joint as shown. It is essential in this case that the coils work freely under torsion.

In accordance with my invention I provide a sleeve 26, shown in detail in Fig. 6, which is loosely telescoped over the bosses 20 and can rotate freely thereon and which substantially fills without binding the center of the coil of the spring and lends it support while not preventing the necessary constriction thereof.

Experiment has shown that in a construction as illustrated without the sleeve the life of the spring was relatively short. With the sleeve, however, it was extended indefinitely and under test withstood repeated actuations of the tool more than equivalent to those which in practice would be effected throughout years of continuous practical use.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A tool of the crossed-lever type, the levers presenting at their opposed inner faces bosses which provide bearings for a pivot pin and annular recesses surrounding the bosses having extensions therefrom, a sleeve freely rotatable about said bosses and a coil spring encircling the sleeve, housed in said recesses and having ends received in the extensions therefrom.

2. A tool comprising a pair of crossed levers pivoted together, their opposed faces adjacent the pivot defining a recess, a coiled torsion spring received in the recess and having ends anchored in the levers respectively and a cylindrical bearing member in the recess loosely fitting within the coil of the spring and freely rotatable within the recess.

3. A tool of the crossed-lever type having associated with the pivot pin thereof a sleeve freely rotatable relative to the pin and levers and a coil spring encircling the sleeve having terminal arms anchored in the levers respectively.

4. A tool of the crossed-lever type having incorporated therewith at the joint a coiled torsion spring, the ends of which are anchored to the levers respectively, and means opposing the interior of the coil rotatable freely with respect to the other parts of the structure.

ANTHONY J. CACARILLO.